US010528336B2

(12) United States Patent
Arcese et al.

(10) Patent No.: US 10,528,336 B2
(45) Date of Patent: Jan. 7, 2020

(54) CREATION OF SOFTWARE IMAGES OF SOFTWARE APPLICATIONS FOR IMAGE-BASED MAINTENANCE OF THE SOFTWARE APPLICATIONS

(71) Applicant: International Business Machines Corporation, Armonk, NY (US)

(72) Inventors: Mauro Arcese, Rome (IT); Giuseppe Ciano, Rome (IT); Claudio Marinelli, Latina (IT); Luigi Pichetti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 15/419,382

(22) Filed: Jan. 30, 2017

(65) Prior Publication Data
US 2018/0217827 A1  Aug. 2, 2018

(51) Int. Cl.
G06F 9/44 (2018.01)
G06F 8/61 (2018.01)
(Continued)

(52) U.S. Cl.
CPC .................. G06F 8/63 (2013.01); G06F 8/61 (2013.01); G06F 8/65 (2013.01); G06F 21/554 (2013.01)

(58) Field of Classification Search
CPC ........ G06F 9/453; G06F 9/45545; G06F 8/65; G06F 8/654; G06F 8/63; G06F 8/61; G06F 3/065; G06F 9/44584; G06F 9/44552; G06F 8/36; H04L 41/0253; G01G 19/4144; G06Q 30/02
See application file for complete search history.

(56) References Cited

U.S. PATENT DOCUMENTS 7,856,439 B2    12/2010  Alpern et al.
8,069,413 B2 *  11/2011  Methot ................... G06F 9/453
                                                        715/705
(Continued)

OTHER PUBLICATIONS

Kecskemeti et al., Towards Efficient Virtual Appliance Delivery with Minimal Manageable Virtual Appliances, IEEE Transactions on Services Computing, vol. 7, No. 2, Apr.-Jun. 2014, pp. 279-292.

(Continued)

Primary Examiner — Tuan A Vu
(74) Attorney, Agent, or Firm — Schmeiser, Olsen & Watts, LLP; Mark Vallone

(57) ABSTRACT

A method and system for creating a software image of a software application. The software application is installed on a computing machine. One or more changes of the computing machine resulting from the installation of the software application are detected. The one or more changes include one or more artifacts being added to the computing machine and one or more updates being applied to the computing machine. One or more activation procedures and activation information according to the updates are determined. The activation procedures are configured to apply the updates when running the activation procedures according to the activation information. The software image are created by copying the artifacts from the computing machine to a virtual disk and by adding the activation procedures and the activation information obtained from the activation procedures to the virtual disk.

14 Claims, 6 Drawing Sheets

(51) Int. Cl.
*G06F 8/65* (2018.01)
*G06F 21/55* (2013.01)

(56) References Cited

U.S. PATENT DOCUMENTS

| | | | |
|---|---|---|---|
| 8,365,164 B1 * | 1/2013 | Morgenstern | G06F 9/44552 717/108 |
| 8,904,081 B1 * | 12/2014 | Kulkarni | G06F 3/065 711/6 |
| 9,110,757 B2 | 8/2015 | Tian et al. | |
| 9,134,991 B2 | 9/2015 | Arcese et al. | |
| 9,990,190 B1 * | 6/2018 | Burriss | G06F 8/63 |
| 9,996,374 B2 * | 6/2018 | Sieffert | G06F 9/45545 |
| 2005/0131578 A1 * | 6/2005 | Weaver | G01G 19/4144 700/244 |
| 2007/0168937 A1 * | 7/2007 | Mallick | G06F 9/44584 717/106 |
| 2007/0233879 A1 * | 10/2007 | Woods | G06Q 30/02 709/227 |
| 2007/0294676 A1 * | 12/2007 | Mellor | G06F 8/65 717/139 |
| 2012/0036552 A1 * | 2/2012 | Dare | H04L 41/0253 726/1 |
| 2012/0216181 A1 * | 8/2012 | Arcese | G06F 8/65 717/168 |
| 2013/0055228 A1 * | 2/2013 | Song | G06F 8/654 717/168 |
| 2013/0132942 A1 * | 5/2013 | Wang | G06F 8/61 717/176 |
| 2013/0232463 A1 * | 9/2013 | Nagaraja | G06F 8/61 717/101 |
| 2015/0081910 A1 | 3/2015 | Assuncao et al. | |
| 2015/0220324 A1 | 8/2015 | Arcese et al. | |
| 2016/0321043 A1 * | 11/2016 | Pavlin | G06F 8/36 |

OTHER PUBLICATIONS

Diaz et al., Abstract Image Management and Universal Image Registration for Cloud and HPC Infrastructures, 2012 IEEE Fifth International Conference on Cloud Computing, 978-0-7695-4755-8/12 $26.00 © 2012 IEEE DOI 10.1109/CLOUD.2012.94, pp. 463-470.

* cited by examiner

CREATION OF SOFTWARE IMAGES OF SOFTWARE APPLICATIONS FOR IMAGE-BASED MAINTENANCE OF THE SOFTWARE APPLICATIONS

TECHNICAL FIELD

The present invention relates generally to the information technology field and more specifically, to software images of software applications.

BACKGROUND

Software images, each software image encapsulating files residing on a computing machine, may be used to facilitate software deployment operations. Particularly, software images allow deploying virtual (computing) machines, each virtual machine emulating a physical (computing) machine by software, in an effective way. Indeed, each virtual machine may be deployed by being created and booted from a corresponding software image that stores the virtual machine's operating system and one or more software applications already installed on the virtual machine. Moreover, the virtual machines may be combined into virtual appliances, each virtual appliance comprising the definition of one or more virtual machines with their software images The virtual appliance is encapsulated in a self-contained package which may be deployed as a unit and is especially advantageous in cloud computing environments, wherein computing resources offered as services are made available on-demand.

The software applications of the virtual machines are typically subject to maintenance operations during the life cycle of the software applications. Modifications may be applied to the software applications from time to time, for example, to correct bugs or to improve operation of the software applications. Once the virtual machines have been deployed from the corresponding software images, maintenance of the software applications is generally managed with a traditional approach (for example, the maintenance is managed with each software application that comprises an embedded updating tool, which is invoked periodically when the software application is launched for downloading any modification thereof that is available online and then applying the software application).

However, traditional maintenance of the software applications requires custom and complex ad hoc searches, which may be time consuming and prone to errors. Moreover, the created software images may not be effectively reused for other software applications (for example, sharing a same middleware).

SUMMARY

Embodiments of the present invention provide a method, and associated computing system and computer program product, for creating a software image of a software application. One or more processors of a computing system install the software application on a computing machine. The one or more processors detect one or more changes of the computing machine resulting from the installation of the software application, said one or more changes comprising one or more artifacts being added to the computing machine and one or more updates being applied to the computing machine. The one or more processors determine one or more activation procedures and activation information according to the updates, said activation procedures being configured to apply the updates when running the activation procedures according to the activation information. The one or more processors create the software image by copying the artifacts from the computing machine to a virtual disk and by adding the activation procedures and the activation information obtained from the activation procedures to the virtual disk.

BRIEF DESCRIPTION OF THE DRAWINGS

The solution of the present invention, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). In this respect, it is expressly intended that the figures are not necessary drawn to scale (with some details that may be exaggerated and/or simplified) and that, unless otherwise indicated, they are merely used to illustrate the structures and procedures described herein conceptually.

DETAILED DESCRIPTION

Figure 1:
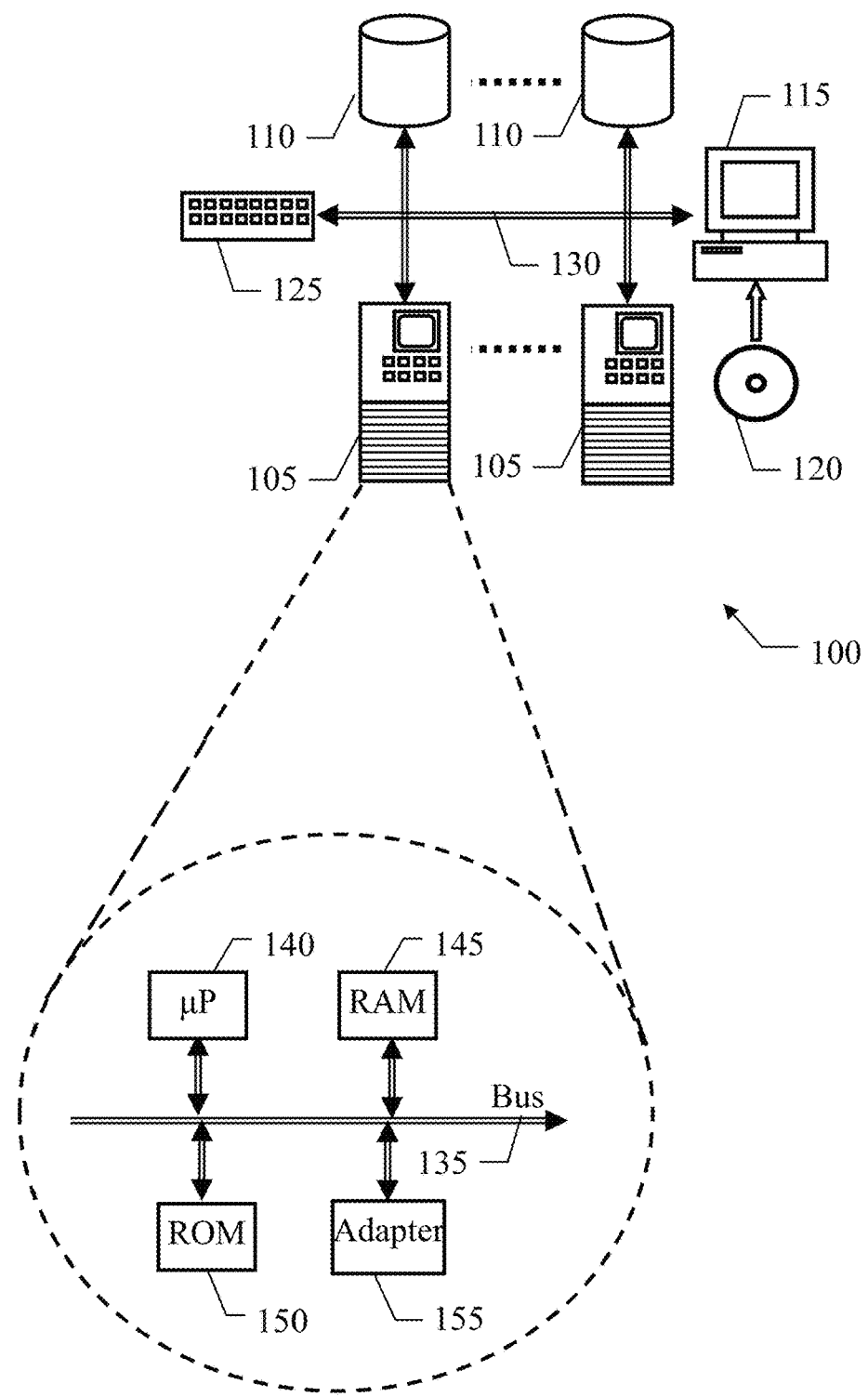
FIG. 1 shows a schematic block-diagram of a computing system in which embodiments of the present invention may be practiced.

FIG. 1 shows a schematic block-diagram of a computing system 100 in which embodiments of the present invention may be practiced.

The present invention improves a computer or a computing system by creating a software image of a software application for enabling image-based maintenance of the software application in the computer or computer system. In the preceding manner, the present invention improves the technology of maintenance of software applications in a computer or computer system.

The computing system 100 is a server farm, which comprises several server computing machines, or simply servers 105 (for example, of the rack or blade type) and storage disks 110 (for example, of the RAID type) implementing mass-memories thereof. The server farm 100 also comprises a console 115 for controlling the storage disks 110 (for example, a personal computer, also provided with a drive for reading/writing removable storage units 120, such as optical disks like DVDs). A switch/router sub-system 125 manages communications among the servers 105, the disks 110 and the console 115. The switch/router sub-system 125 also manages communications with a network, not shown in FIG. 1 (for example, the Internet or a LAN). For this purpose, the servers 105, the disks 110 and the console 115 are connected to the switch/router sub-system 125 through a cabling sub-system 130. For example, the server farm 100 may implement a cloud node of a cloud computing environment, wherein (virtual) cloud resources are made available on-demand as cloud services according to different service models, such as Infrastructure as a Service (IaaS), Platform as a Service (PaaS), Software As a Service (SAS) or Network as a service (NaaS), and/or according to different deployment models, such as public cloud, private cloud, community cloud or hybrid cloud. Several users may access the cloud computing environment by connecting to the cloud computing environment with corresponding client computing machines (not shown in the figure) through the network (i.e., the Internet in a public/community cloud or a LAN in a private cloud), so as to have the sole control of the cloud resources of the several users (which may then be used exactly as if the cloud resources were dedicated physical resources).

Each server 105 is formed by several units that are connected in parallel to a bus structure 135. In detail, one or more microprocessors (μP) 140 control operation of the server 105. A RAM 145 is directly used as a working memory by the microprocessors 140, and a ROM 150 stores basic code for a bootstrap of the server 105. Moreover, the server 105 comprises a network adapter 155, which is used to connect the server 105 to the cabling sub-system 130.

Figure 2A:
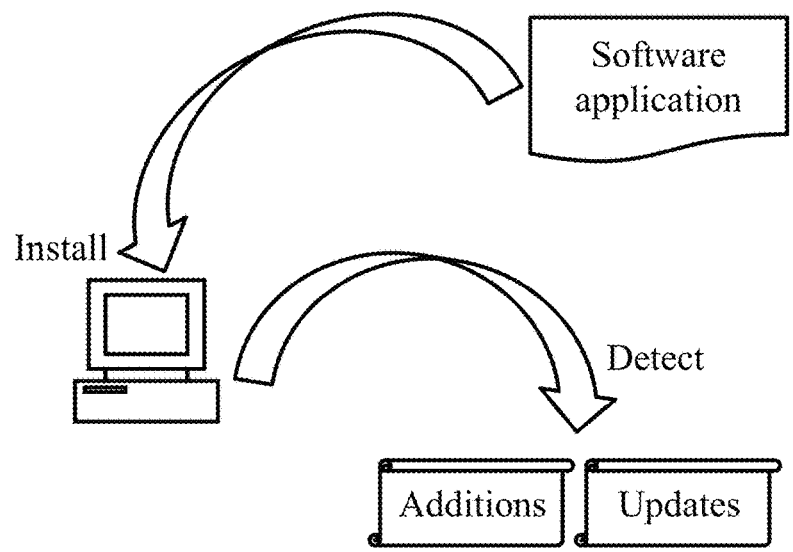
FIGS. 2A-2C show general principles according to embodiments of the present invention.
Figure 2B:
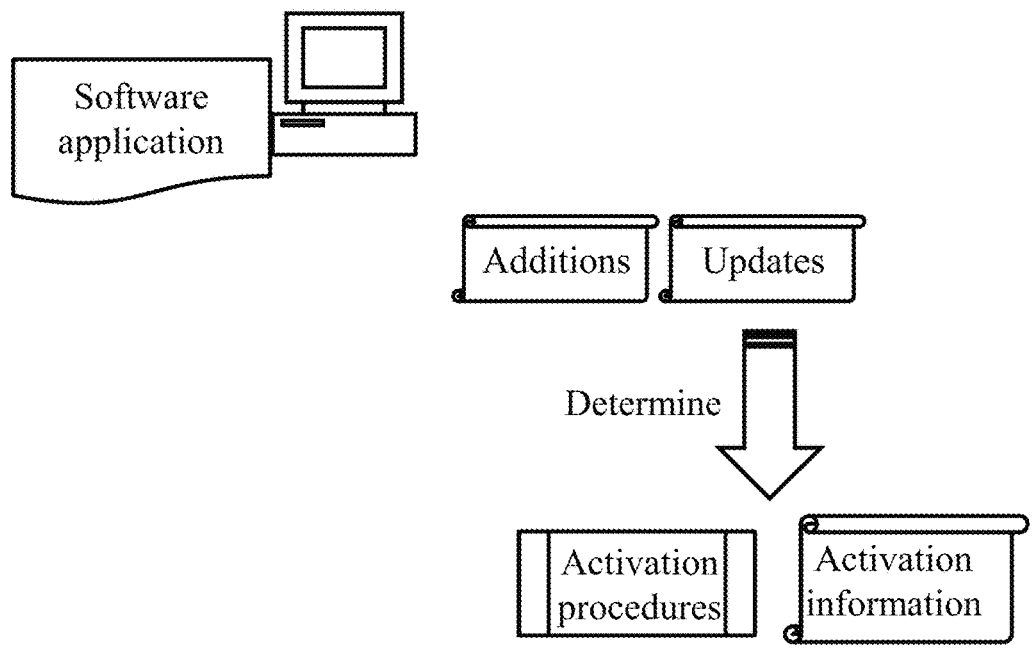
Figure 2C:
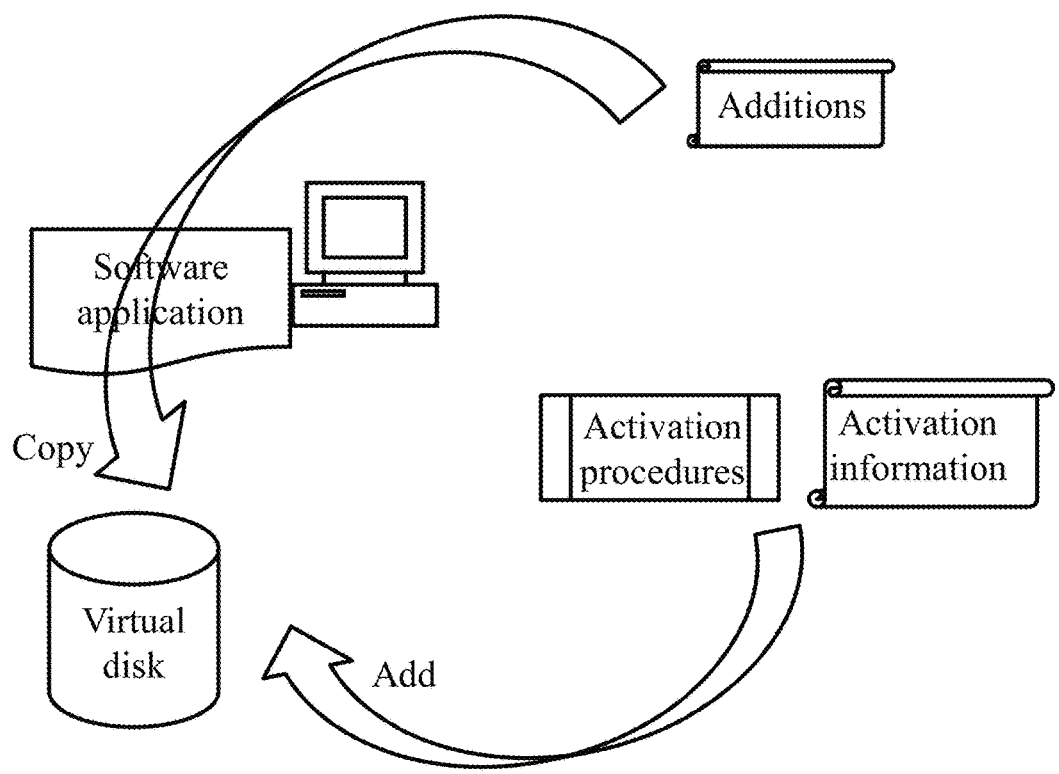

FIGS. 2A-2C show general principles according to embodiments of the present invention.

Starting from FIG. 2A, a generic software application (which, in one embodiment, is deployed with a software image adapted to support the software application's image-based maintenance) is installed onto a generic computing machine. For example, the software application may be installed onto a virtual (computing) machine that is hosted on the server farm. The software application may be provided with a corresponding software image which is an initial copy of the software application (which in one case is not adapted to support the software application's image-based maintenance) or in another case, the software application may be installed with a standard procedure (from a corresponding installation package). In both cases, the software application may be installed ex novo or as an update of another version thereof.

One or more changes of the virtual machine resulting from the installation of the software application may be detected (for example, by means of corresponding change sensors that correspond to the software application). The one or more changes may comprise one or more (software) artifacts that have been added to the virtual machine (for example, files encompassed by the software application) and/or one or more (software) updates of the software application that have been applied to the virtual machine (for example, configuration modifications of the software application).

Moving to FIG. 2B, one or more activation procedures (for example, scripts) and activation information (for example, configuration information) are determined according to the preceding changes of the virtual machine. The activation procedures are adapted to apply the preceding changes when run according to the activation information (for example, to configure the operating system accordingly).

Moving to FIG. 2C, the software image of the software application is created. For this purpose, the files encompassed by the software application that have been added to the virtual machine are copied from the virtual machine to a (new) virtual disk (for example, of self-activating type). Moreover, the activation procedures and the activation information are added to the same virtual disk (for example, in corresponding metadata), so as to be separated from each other (for example, in different files). In this way, the obtained software image is ready to support the image-based maintenance of the software application (as described in detail infra).

The above-described solution allows creating software images that are adapted to support the image-based maintenance of the software application in a substantial automatic way (with no, or at least reduced, manual intervention), which significantly decreases the time required to perform the corresponding operations and the possibility of any errors. Moreover, the obtained results of the image-based maintenance of the software application may be effectively reused for other software applications (for example, sharing a same middleware).

Figure 3:
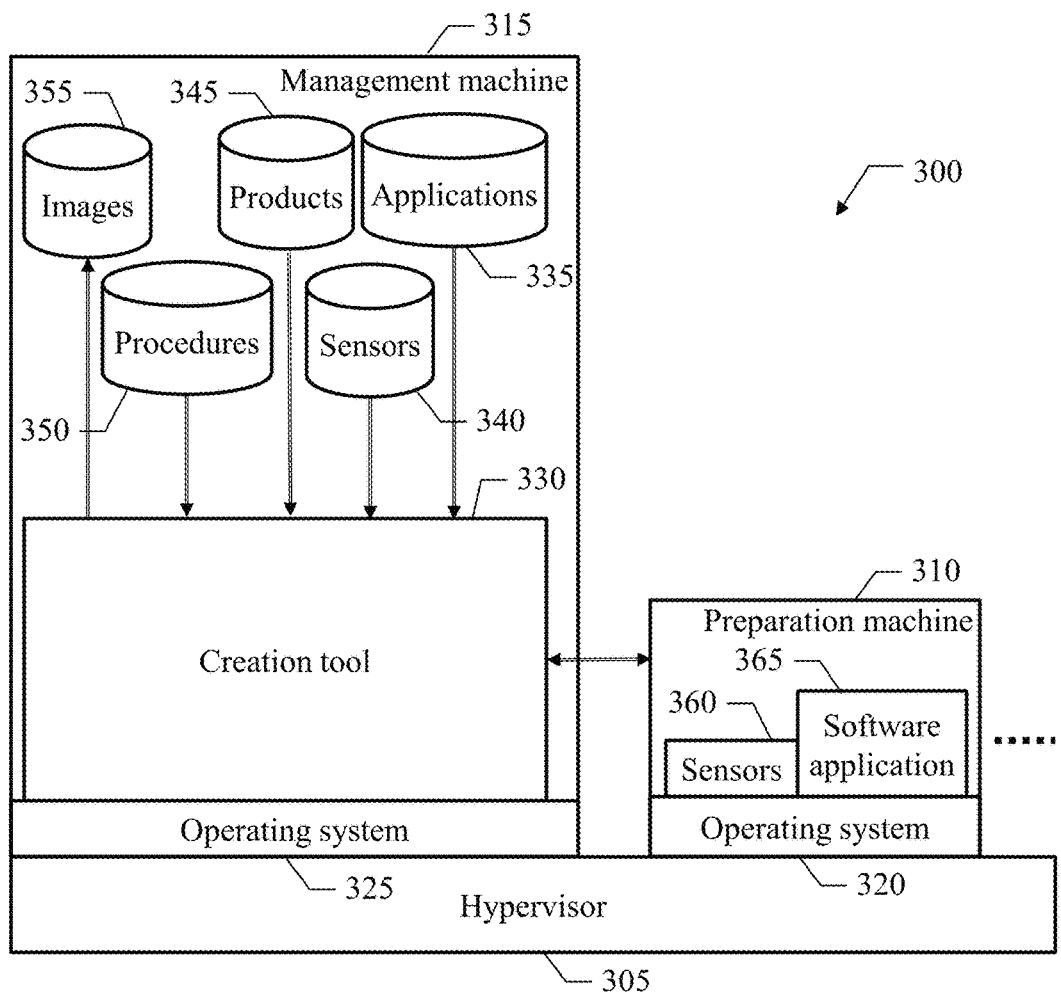
FIG. 3 shows software components that may be used to implement embodiments of the present invention.

FIG. 3 shows software components that may be used to implement embodiments of the present invention.

Particularly, all the software components (programs and data) are denoted as a whole with the reference 300. The software components are typically stored in the mass memory and loaded (at least partially) into the working memory of each computing machine when the programs are running. The programs are initially installed into the mass memory, for example, from removable storage units or from the network. In this respect, each program may be a module, segment or portion of code, which comprises one or more executable instructions for implementing the specified logical function.

A hypervisor 305 directly runs on a hardware structure of a generic server; the hypervisor 305 emulates a dedicated virtual hardware structure for a plurality of virtual machines. As far as relevant to the present disclosure, the virtual machines comprise one or more preparation (virtual) machines 310 for preparing the required software images and a management (virtual) machine 315 for managing the preparation machines 310. Each preparation machine 310 and the management machine 315 comprise an operating system 320 and 325, respectively (directly running on a virtual hardware structure of each preparation machine 310 or the management machine 315, respectively, to define a software platform for the running of other software programs). The hypervisor 305 facilitate communication and interaction between and among the management machine 315 and the preparation machines 310.

With reference in particular to the management machine 315, a creation tool 330 manages the creation of the software images. The creation tool 330 accesses (in read mode) an application repository 335. For each software application to be deployed (with software images supporting the image-based maintenance), the application repository 335 stores its software image (non-adapted to support the image-based maintenance) or its (standard) installation package. The creation tool 330 accesses (in read mode) a sensor repository 340 which stores change sensors adapted to detect the changes of the preparation machines 310 (resulting from the installation of the software applications). Each change sensor stored in sensor repository 340 is capable of detecting a type of change of the preparation machines 310 (for example, one or more changes to a file system of the preparation machines 310, one or more changes to databases of the preparation machine 310, one or more changes to operating system services of the preparation machines 310). The creation tool 330 accesses (in read mode) a product library 345. For each software application to be deployed, the product library 345 stores an indication of one or more software products that are within the software application, and for each software product that may be within the software applications to be deployed, the product library 345 stores an indication of one or more of the change sensors to be used to detect the changes of the preparation machines 310 resulting from each software product's installation. The creation tool 330 accesses (in read mode) a procedure library 350. For each software product that may be within the software applications to be deployed, the procedure library 350 stores one or more predefined (customization) procedures (if any) to be applied to the software product in order to adapt the software product to support the image-based maintenance. The creation tool 330 controls (in write mode) an image repository 355, which stores the software images (supporting the image-based maintenance) of the software applications to be deployed.

Each preparation machine 310 runs the change sensors 360 that are required to detect the changes of the preparation machines 310 resulting from the installation of each software application 365. If necessary, the preparation machine 310 may also comprise an installation engine (not shown in the figure), which is used to control the installation of the software applications from installation packages configured to install the software packages.

The creation tool 330 interacts with the preparation machines 310 by commands supported by an interface of the hypervisor 305. These commands may be used to perform operations either on the preparation machines (for example, starting and stopping the preparation machines) or on the operating system 320 used by the preparation machines (for example, performing activities, starting/stopping software programs, submitting queries, copying files).

Figure 4A:
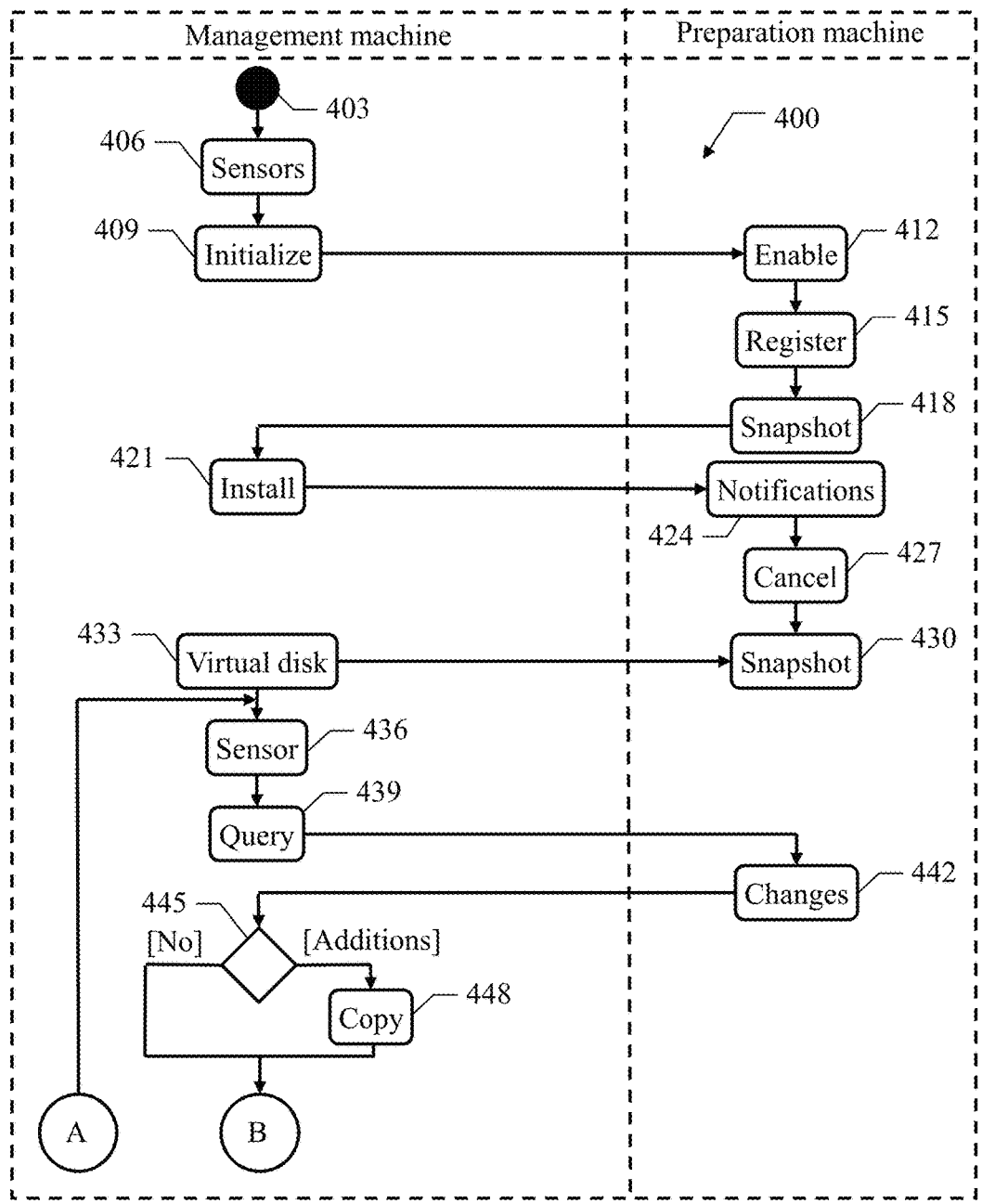
FIGS. 4A-4B shows flow diagrams describing the flow of activities relating to implementation of embodiments of the present invention.
Figure 4B:
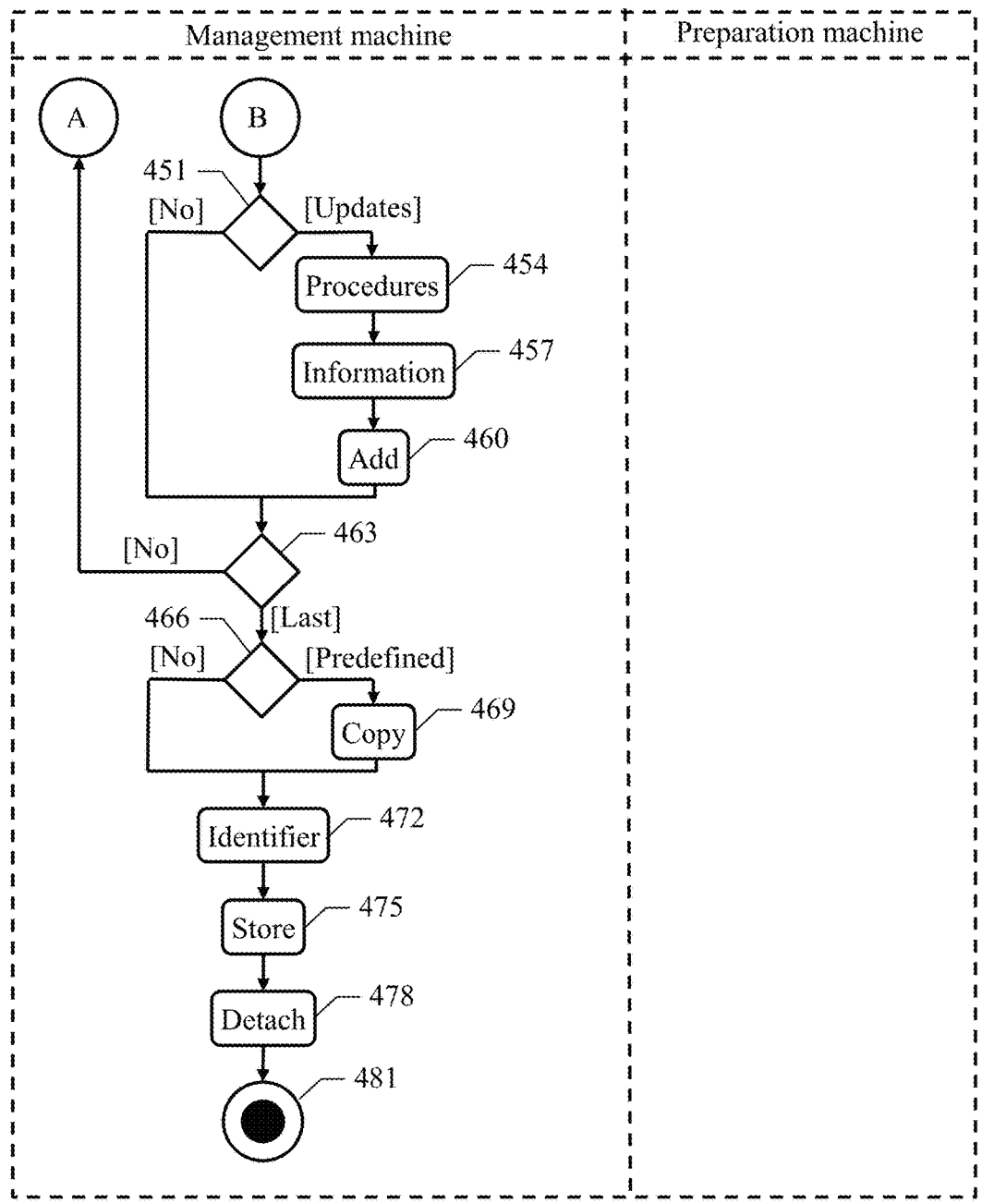

FIGS. 4A-4B shows flow diagrams describing the flow of activities relating to implementation of embodiments of the present invention.

As discussed supra for FIG. 3, each change sensor stored in sensor repository 340 in the management machine 315, and each change sensor 360 stored in the preparation machines 310, is configured to detect the changes of the preparation machines 310 resulting from the installation of the software applications. Thus, each reference to "change sensor" in the description infra of FIGS. 4A-4B applies to the change sensors stored in sensor repository 340 in the management machine 315 and/or the sensors 360 stored in the preparation machines 310. In other words, either, both, or a combination of the change sensors stored in sensor repository 340 in the management machine 315 and/or the sensors 360 stored in the preparation machines 310 may be used interchangeably to implement the method described in the flow diagrams of FIGS. 4A-4B.

Particularly, the flow diagrams represent an exemplary process that may be used to create a software image (supporting the image-based maintenance) of a generic software application with a method 400. In this respect, each block may correspond to one or more executable instructions for implementing the specified logical function on the relevant computing machines.

The process begins at the black start circle 403 in the swim-lane of the management machine and then passes to block 406 as soon as the creation of a software image (supporting the image-based maintenance) of the software application is required (for example, by submitting a corresponding command to the creation tool). In response thereto, the creation tool determines the software products of the software application and then the corresponding change sensors (from the product library). Continuing to block 409, the creation tool enables these change sensors in a specific preparation machine (after installing the change sensors if the change sensors were not already enabled).

Moving to the swim-lane of the preparation machine, in response the change sensors being enabled in step 409, the change sensors start at block 412. With reference now to block 415, each change sensor based on a notification mechanism (wherein the type of changes detected when the changes occur) registers a callback function to the operating system 320 of the preparation machine (for notifying the same change sensor of any type of change). With reference to block 415, each change sensor based on a collection mechanism (wherein the type of changes are detected by a differencing operation) takes a corresponding (first) snapshot of the preparation machine; for this purpose, the change sensor collects information relating to the type of changes, which information defines a corresponding (first) status of the preparation machine before the installation of the software application.

Returning to the swim-lane of the management machine, as soon as all the snapshots have been taken, the software application is installed onto the preparation machine (block 421); the software application may be installed either automatically by the creation tool or manually by an operator. During the installation of the software application, any (notification-based) change sensor is notified of any type of change as soon as the type of change occurs and then the change sensor saves an indication of the type of change at block 424 in the swim-lane of the preparation machine. For example, when a configuration parameter is changed, the operating system invokes the callback function of the corresponding change sensor by passing the name and new value of the configuration parameter. As soon as the installation of the software application has been completed, each (notification-based) change sensor at block 427 cancels the corresponding callback function to the operating system of the preparation machine (for stopping the notification to the change sensor of the type of changes). Each (collection-based) change sensor at block 430 takes a corresponding (second) snapshot of the preparation machine; as above, the change sensor collects information relating to the type of changes, which information defines a corresponding (second) status of the preparation machine after the installation of the software application.

Returning to the swim-lane of the management machine at block 433, the creation tool prepares a (new) virtual disk, being empty at the beginning in step 403, and attaches (mounts) the virtual disk to the management machine. The creation tool then initializes the virtual disk by adding metadata of the software application (for example, in one or more XML files) to be used for the software application's image-based maintenance. Particularly, the metadata comprise an application identifier that identifies the software application (for example, by the software application's vendor and name) and a level identifier that identifies a level of the software application (for example, the software application's version, release and service pack) Moreover, the metadata may comprise a stop command and a start command for starting and stopping, respectively, the software application (if required for the software application's image-based maintenance).

The creation tool then performs a loop for processing the changes of the preparation machine (resulting from the installation of the software application) as detected by the change sensors. The loop begins at block 436, wherein a (current) change sensor is taken into account (starting from a first change sensor in any arbitrary order). Continuing to block 439, the creation tools queries the change sensor for the type of changes that have been detected by the change sensor (during the installation of the software application).

Moving to the swim-lane of the preparation machine, in response to the query in step 439, the change sensor determines the corresponding changes at block 442. Particularly, if the change sensor is notification-based, the changes are directly defined by the corresponding notifications that have been received by it during the installation of the software application. Instead, if the change sensor is collection-based, the changes are obtained by a differencing operation between the snapshot taken after the installation of the software application and the snapshot taken before the installation of the software application (for example, added/modified/deleted artifacts such as files). In both cases, the change sensor returns an indication of the changes to the creation tool and then stops.

Returning to the swim-lane of the management machine, the flow of activity passes to block 445 as soon as the indication of the changes has been received from the change sensor. At step 445, the creation tool verifies whether the changes comprise the addition of files (or other artifacts) to the preparation machine. If so, the creation tool at block 448 copies theses files from the preparation machine to the virtual disk. Typically, the files are organized in a hierarchal structure in the preparation machine (i.e., the file system of its operating system). Particularly, the file system defines a tree with corresponding nodes (representing directories or files), starting from a root node (for a virtual disk of the preparation machine) down to leaf nodes (for either empty sub-directories or files). For each sub-tree of the preparation machine containing one or more files to be copied (starting from a parent node thereof), these files are copied to a corresponding sub-tree of the virtual disk that directly depends on its root node. The process then continues to block 451; the same point is also reached directly from the block 445 if the changes do not comprise the addition of any files to the preparation machine.

At step 451, the creation tool verifies whether the changes comprise the application of updates to the preparation machine. If so, the creation tool at block 454 determines one or more activation commands for applying these updates (i.e., changes). For example, the activation commands may be adapted to modify configurations (such as used port numbers, accessed host names/IP addresses) and/or to migrate data (such as database schema). Continuing to block 457, the creation tool determines one or more activation parameters for applying the same updates. For example, the activation parameters may define configuration values (such as port numbers, host names/IP addresses) and/or data formats (such schema versions). More specifically, each update that has been applied to the preparation machine generally comprises the modification of one or more artifacts thereof (for example, registries, databases), which are identified by corresponding artifact (unique) identifiers in the preparation machine (for example, a full path of files in the file system of the preparation machine, starting from the root until reaching the files through any interposed sub-directories). The update involves the modification to corresponding new values of one or more elements of these artifacts (for example, registry keys, database definitions), which are identified by corresponding local (unique) identifiers in the artifacts (for example, key names, schema names). The activation parameters are then defined by the local identifiers of the elements, in association with the new values of the activation parameters when independent of the preparation machine (for example, database schemas) or null values otherwise (for example, port numbers, host names/IP addresses). The activation commands are instead defined by commands for modifying the elements to the corresponding new values (indicated in the activation parameters) in the artifacts. The artifacts are identified in the activation commands by replacing the artifact identifiers with corresponding generalized identifiers. For this purpose, each artifact identifier is split into an absolute component depending on the preparation machine and a relative component depending on the absolute component (for example, the path of the subtree and the path within the subtree, respectively, of the files that have been added to the preparation machine). The global component is then replaced with a corresponding variable. In this way, the activation commands are made independent of the preparation machine.

Continuing to block 460, the creation tool adds the activation commands to one or more activation procedures (for example, scripts) in the metadata of the virtual disk (empty at the beginning). For example, the activation procedures comprise one or more configuration procedures for modifying the configurations and one or more migration procedures for migrating the data. Moreover, the creation tool adds the activation parameters to activation information (for example, in form of key-value pairs) in the metadata of the virtual disk. For example, the activation information comprises configuration information for the configuration procedures and migration information for the migrating procedures. In any case, the activation information is stored so as to be separated from the activation procedures, which means that the activation information may be used independently of the corresponding activation procedures, as required by the image-based maintenance (as described next). The process then continues to block 463; the same point is also reached directly from the block 451 if the changes do not comprise the application of any updates to the preparation machines.

At block 463, the creation tool verifies whether a last change sensor has been processed. If not, the process returns to the block 436 to repeat the same operations on a next change sensor. Conversely (once all the change sensors have been processed), the loop is exited by descending into block 466.

At block 466, the creation tool now verifies whether any predefined procedures are available in the procedure library for each software product of the software application. If so, the creation tool at block 469 copies these predefined procedures from the procedure repository to the virtual disk (by adding them to its metadata). For example, the predefined procedures may comprise an installation procedure that is used for installing the software application (the first time) and a removal procedure for removing the software application (by undoing its installation). The process then continues to block 472; the same point is also reached directly from the block 466 if no predefined procedure is available.

At block 472, the creation tool generates a disk (unique) identifier of the virtual disk. For example, the disk identifier is calculated by a UUID generator according to one or more attributes of the virtual disk (such as the virtual disk's name, size) and/or of the software application (such as the software application's name and level). Continuing to block 475, the creation tool stores the disk identifier into the virtual disk (by adding it to the virtual disk's metadata). With reference now to block 478, the creation tool detaches (dismounts) the virtual disk from the management machine, and creates a corresponding software image (i.e., one or more files defining the whole virtual disk in a suitable format, for example, VMDK); the creation tool adds this software image to the image repository. The process then ends at block 481.

The software images so obtained may be used to maintain the corresponding software applications (comprising their first installation) on any virtual machine. The virtual machine comprises a (system) virtual disk, or more, for its operating system, a (program) virtual disk, or more, for each software application that is installed thereon (created as described above) and a (data) virtual disk, or more, for the data of each software application. A maintenance agent detects any new (product) virtual disk that is attached to the virtual machine, by periodically collecting the disk identifiers of the virtual disks attached to the virtual machine and searching them in a disk list storing the disk identifier, the product identifier and the level identifier of each (product) virtual disk attached to the virtual machine. For each new virtual disk, the maintenance agent searches the application identifier extracted therefrom in the disk list. If the application identifier is not found, the new virtual disk is for the first installation of the corresponding software application, whereas on the contrary the new virtual disk is for the maintenance of a current level of the same software application, already installed in a corresponding (current) virtual disk, to a new level thereof (assuming that the level identifier of the new virtual disk is different form the level identifier of the current virtual disk). In case of maintenance, the maintenance agent executes the stop command extracted from the current virtual disk to stop the current level of the software application (if necessary). In any case, the maintenance agent dismounts a (local) file system of the current virtual disk from a corresponding mounting point within a (global) file system of the virtual machine, and then mounts a (local) file system of the new virtual disk to the same mounting point. The maintenance agent bounds each generalized identifier of the activation procedures extracted from the new virtual disk to corresponding values depending on the virtual machine (for example, the mounting point for the path to the local file system of the new virtual disk) and then runs the activation procedures. In case of first installation, the maintenance agent prompts an operator to enter the values of the activation parameters indicated in the activation information of the new virtual disk that are unset (null values). In this way, the installation of the software application is customized at will. Instead, in case of maintenance, the maintenance agent passes the activation information extracted from the current virtual disk (with the values of all the activation parameters) to the activation procedures. In this way, the customization of the current level of the software application is preserved. In both cases, the maintenance agent modifies the activation information in the new virtual disk accordingly. Particularly, the maintenance agent copies the configuration information that has been used by the activation procedures, which comprises the configuration information entered by the operator in case of first installation or the configuration information of the current virtual disk (excluding what does not apply any longer) in case of maintenance, and it comprises the migration information of the new virtual disk when the virtual disk has been changed or the migration information of the current virtual disk otherwise. The maintenance agent copies the removal procedure (if any) from the new virtual disk to the system virtual disk. At the end, the maintenance agent detaches the current virtual disk from the virtual machine, updates the disk list accordingly and executes the start command extracted from the new virtual disk to re-start the software application (if necessary). The maintenance agent may also detect any (product) virtual disk that is detached from the virtual machine, as above by periodically collecting the disk identifiers of the virtual disks attached to the virtual machine and comparing them with the disk list. For each (old) virtual disk that is missing in the disk list, the maintenance agent runs the corresponding removal procedure stored in the system virtual disk (if any) to undo its installation. The maintenance agent then deletes this removal procedure and updates the disk list accordingly.

Naturally, in order to satisfy local and specific requirements, a person skilled in the art may apply many logical and/or physical modifications and alterations to the present invention. More specifically, although the present invention has been described with a certain degree of particularity with reference to one or more embodiments thereof, it should be understood that various omissions, substitutions and changes in the form and details as well as other embodiments are possible. Particularly, different embodiments of the present invention may even be practiced without the specific details (such as the numerical values) set forth in the preceding description to provide a more thorough understanding thereof. Conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for creating a software image of a software application. However, the software image may be of any type (for example, stored in any number of files with any format, like VHD, VDI, ISO) and the software application may be of any type (for example, for end-users, system administrators, programmers).

In an embodiment, the method comprises installing the software application on a computing machine. However, the software application may be installed in any way (for example, with software distribution techniques) on any computing machine (for example, a physical machine).

In an embodiment, the method comprises detecting one or more changes of the computing machine resulting from the installation of the software application. However, the changes may be detected in any way and the changes may be of any type (for example, any number of added artifacts and updates).

In an embodiment, the changes comprise one or more artifacts being added to the computing machine and one or more updates being applied to the computing machine. However, the added artifacts may be in any number and of any type (for example, desktop links) and the updates may be in any number and of any type (for example, registrations to remote services).

In an embodiment, the method comprises determining one or more activation procedures and activation information according to the updates. However, the activation procedures may be in any number and of any type (for example, command lists, executable files) and the activation information may be in any format (for example, one or more files, like of CSV type).

In an embodiment, the activation procedures are adapted to apply the updates when run according to the activation information. However, the activation procedures may be run according to the activation information in any way (for example, by the activation procedures that read the activation information directly) to cause any action (for example, modifying user names, modifying XML schemas, creating files/tables); moreover, the activation procedures may be of any type (for example, any configuration procedures, migration procedures or combination thereof, or additional, different or alternative procedures, like for updating external software products) and the activation information may be of any type (for example, any configuration information, migration information or combination thereof, or additional, different or alternative information, like monitoring information).

In an embodiment, the method comprises creating the software image by copying the artifacts from the computing machine to a virtual disk and by adding the activation procedures and the activation information separated from the activation procedures to the virtual disk. However, the software image may comprise any number of virtual disks (with any format) with additional, different or alternative data (for example, without any start/stop command, any installation/removal procedure, with migration policies, installation constraints), moreover, the activation procedures and the activation information may be separated to each other in any way (either physically or logically).

In an embodiment, said step of detecting one or more changes comprises collecting an indication of a first status of the computing machine before installing the software application. However, the first status may be collected in any way (for example, with the computing machine that is shut down).

In an embodiment, said step of detecting one or more changes comprises collecting an indication of a second status of the computing machine after installing the software application. However, the second status may be collected in any way (either the same or different with respect to the first status).

In an embodiment, said step of detecting one or more changes comprises determining at least part of the changes according to a comparison between the second status and the first status. However, the changes may be determined in any way (for example, only considering added/removed/modified artifacts or inspecting them as well).

In an embodiment, said step of detecting one or more changes comprises receiving a notification of at least part of the changes in response thereto during the installation of the software application. However, the notifications may be received in any way (for example, individually in real-time or cumulatively at the end of the installation of the software application).

In an embodiment, said step of detecting one or more changes comprises registering one or more callback functions to an operating system of the computing machine for causing the operating system to notify the corresponding changes. However, the callback functions may be in any number and of any type (for example, notifying the creation tool directly) and they may be registered to additional, different or alternative software programs (for example, a DBMS).

More generally, the changes may be detected in additional, different or alternative ways (for example, by hooking techniques).

In an embodiment, said step of detecting one or more changes comprises enabling one or more change sensors, each change sensor for a corresponding type of the changes before installing the software application. However, the sensors may be enabled in any way (for example, by installing and starting the change sensors, by simply starting the change sensors) and the change sensors may be in any number for any type of changes (for example, relating to file system, operating system, databases).

In an embodiment, said step of detecting one or more changes comprises querying each one of the change sensors after installing the software application for an indication of each type of change being detected by the change sensor. However, the change sensors may be queried at any time (comprising during the installation of the software application) for collecting any information (for example, only the first status and the second status of the computing machine with the corresponding changes that are determined accordingly by the creation tool).

In an embodiment, the software application comprises one or more software products. However, the software application may comprises any number and type of software products, down to a single one (for example, utilities, tools, libraries).

In an embodiment, said step of enabling one or more change sensors comprises retrieving an indication of one or more of the change sensors associated with each software product. However, the change sensors may be determined in any way (for example, in the Internet), even at the level of the whole software application directly; in any case, the possibility of always using the same change sensors (independently of the software application) is not excluded.

In an embodiment, said step of creating the software image comprises retrieving an indication of one or more predefined procedures associated with the software application. However, the predefined procedures may be in any number (down to none) and they may be determined in any way (for example, in the Internet), at the level of either the software products or the whole software application.

In an embodiment, said step of creating the software image comprises copying the predefined procedures to the virtual disk. However, the predefined procedures may be added in any way (for example, by integrating them into the activation procedures).

In an embodiment, the predefined procedures comprise an installation procedure for installing the software application and/or a removal procedure for removing the software application. However, the predefined procedures may be of additional, different or alternative type (for example, for applying specific customizations).

In an embodiment, the artifacts are stored in the computing machine at one or more nodes of a hierarchical structure; the nodes comprise one or more parent nodes depending on none of said nodes. However, any number and type of the artifacts (down to none) may be stored in any hierarchical structure with any number and type of nodes (for example, tables of a database).

In an embodiment, said step of creating the software image comprises copying the artifacts from the computing machine to a further hierarchical structure of the virtual disk with each parent node depending on a root node of the further hierarchical structure. However, the artifacts may be copied in any way (for example, always to form a single subtree).

In an embodiment, at least part of the updates are applied to one or more further artifacts of the computing machine each one identified by a corresponding artifact identifier, which comprises an absolute component depending on the computing machine and a relative component depending on the absolute component. However, the further artifacts may be in any number (down to none) and of any type (for example, added or existing artifacts like files, tables) and their identifiers may be of any type, with any absolute component and relative component (for example, path and name, database and table).

In an embodiment, said step of determining one or more activation procedures comprises replacing the absolute component of each artifact identifier with a corresponding variable in the activation procedures. However, this operation may be performed in any way (for example, by means of wild characters).

In an embodiment, said step of creating the software image comprises generating a unique disk identifier of the virtual disk. However, the disk identifier may be generated in any way (for example, according to a timestamp); in any case, this operation may also be omitted at all (for example, by discriminating the virtual disks with hash values thereof).

In an embodiment, said step of creating the software image comprises storing the disk identifier into the virtual disk. However, the disk identifier may be stored in any way (for example, in a header of the virtual disk).

An embodiment provides a method for maintaining a software application installed on a virtual machine. However, the method may be applied to any type of virtual machine (for example, part of a virtual appliance or stand-alone, even not in a cloud computing environment) to perform any maintenance of the software application (for example, to upgrade or to downgrade it).

In an embodiment, the method comprises creating a new software image of the software application according to the above-mentioned method. However, the new software image may relate to any new level of the software application (for example, a different version, release, service pack).

In an embodiment, the method comprises removing a current software image of the software application from the virtual machine. However, the current software image may have been created in any way (for example, in the same way as the new software image or in any other way, even manually).

In an embodiment, the method comprises adding the new software image to the virtual machine. However, the new software image may be added in any way (for example, either before or after removing the current software image, by verifying the availability of the new software image in the Internet periodically).

In an embodiment, the method comprises running the activation procedures of the new software image according to activation information of the current software image. However, the running of the activation procedures may involve additional, different or alternative operations (for example, a rebooting of the virtual machine).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

An embodiment provides a computer program configured for causing a computing system to perform each one of the above-mentioned methods when the computer program is executed on the computing system. An embodiment provides a computer program product, the computer program product comprising a computer readable storage hardware medium or hardware device having program instructions embodied therewith, the program instructions executable by a computing system to cause the computing system to perform each one of the same methods. However, the software program may be implemented as a stand-alone module, as a plug-in for a pre-existing software program (for example, in a software distribution application), or even directly in the latter; moreover, it is also possible to deploy the same solution as a service that is accessed through a network (such as in the Internet).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

An embodiment provides a system comprising means configured for performing the steps of each one of the above-mentioned methods. An embodiment provides a system comprising a circuitry (i.e., any hardware suitably configured, for example, by software) for performing each step of the same methods. However, the system may be of any type (for example, of physical or virtual type, with a stand-alone or a distributed architecture).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for creating a software image of a software application, said method comprising:

installing, by one or more processor of a computing system, the software application on a computing machine;

during said installing the software application, detecting, by the one or more processors, one or more changes of the computing machine occurring during said installing the software application, said one or more changes comprising one or more artifacts being added to the computing machine and one or more updates being applied to the computing machine;

determining, by the one or more processors, one or more activation procedures and activation information according to the updates, said activation procedures being configured to apply the updates when running the activation procedures according to the activation information;

creating, by the one or more processors, the software image by copying the artifacts from the computing machine to a virtual disk and by adding the activation procedures and the activation information obtained from the activation procedures to the virtual disk;

prior to said installing the software application, enabling one or more change sensors, each change sensor pertaining to a corresponding type of change of the one or more changes;

prior to said installing the software application, registering one or more callback functions to an operating system of the computing machine for causing the operating system to communicate the one or more changes to the one or more change sensors corresponding to the one or more callback functions;

during said installing the software application, receiving, by the one or more change sensors from the operating system, the one or more changes; and as soon as said installing the software application has been completed, cancelling registration of the one or more callback functions to the operating system of the computing machine.

2. The method of claim 1, wherein said detecting one or more changes comprises:
collecting an indication of a first status of the computing machine before said installing the software application;
collecting an indication of a second status of the computing machine after said installing the software application; and
determining at least part of the one or more changes according to a comparison between the second status and the first status.

3. The method of claim 1, wherein said detecting one or more changes comprises:
receiving a notification of at least part of the one or more changes during said installing the software application.

4. The method of claim 1, wherein the software application comprises one or more software products, said enabling one or more change sensors comprising:
retrieving an indication of at least one change sensor of the one or more change sensors associated with each software product.

5. The method of claim 1, wherein said creating the software image comprises:
retrieving an indication of one or more predefined procedures associated with the software application; and
copying the predefined procedures to the virtual disk.

6. The method of claim 5, wherein the predefined procedures comprise an installation procedure for installing the software application and/or a removal procedure for removing the software application.

7. The method of claim 1, wherein the artifacts are stored in the computing machine at one or more nodes of a hierarchical structure, said nodes comprising one or more parent nodes not depending on the one or more nodes, and wherein said creating the software image comprises:
copying the artifacts from the computing machine to a further hierarchical structure of the virtual disk with each parent node depending on a root node of the further hierarchical structure.

8. The method of claim 1, wherein at least part of the updates are applied to one or more further artifacts of the computing machine, each update identified by a corresponding artifact identifier comprising an absolute component depending on the computing machine and a relative component depending on the absolute component, said determining one or more activation procedures comprising:
replacing the absolute component of each artifact identifier with a corresponding variable in the activation procedures.

9. The method of claim 1, wherein said creating the software image comprises:
generating a unique disk identifier of the virtual disk; and
storing the unique disk identifier into the virtual disk.

10. The method of claim 1, wherein the created software image is a new software image, and wherein the method further comprises:
removing, by the one or more processors, a current software image of the software application from the virtual machine;
adding, by the one or more processors, the new software image to the virtual machine; and
running, by the one or more processors, the activation procedures of the new software image according to activation information of the current software image.

11. A computer program product, comprising one or more computer readable hardware storage devices having computer readable program code stored therein, said program code containing instructions executable by one or more processors of a computer system to implement a method for creating a software image of a software application, said method comprising:
installing, by the one or more processors, the software application on a computing machine;
during said installing the software application, detecting, by the one or more processors, one or more changes of the computing machine occurring during said installing the software application, said one or more changes comprising one or more artifacts being added to the computing machine and one or more updates being applied to the computing machine;
determining, by the one or more processors, one or more activation procedures and activation information according to the updates, said activation procedures being configured to apply the updates when running the activation procedures according to the activation information;
creating, by the one or more processors, the software image by copying the artifacts from the computing machine to a virtual disk and by adding the activation procedures and the activation information obtained from the activation procedures to the virtual disk;
prior to said installing the software application, enabling one or more change sensors, each change sensor pertaining to a corresponding type of change of the one or more changes;
prior to said installing the software application, registering one or more callback functions to an operating system of the computing machine for causing the operating system to communicate the one or more changes to the one or more change sensors corresponding to the one or more callback functions;
during said installing the software application, receiving, by the one or more change sensors from the operating system, the one or more changes; and
as soon as said installing the software application has been completed, cancelling registration of the one or more callback functions to the operating system of the computing machine.

12. The computer program product of claim 11, wherein said detecting one or more changes comprises:
- collecting an indication of a first status of the computing machine before said installing the software application;
- collecting an indication of a second status of the computing machine after said installing the software application; and
- determining at least part of the one or more changes according to a comparison between the second status and the first status.

13. A computing system, comprising one or more processors, one or more memories, and one or more computer readable hardware storage devices, said one or more hardware storage device containing program code executable by the one or more processors via the one or more memories to implement a method for creating a software image of a software application, said method comprising:
- installing, by the one or more processors, the software application on a computing machine;
- during said installing the software application, detecting, by the one or more processors, one or more changes of the computing machine occurring during said installing the software application, said one or more changes comprising one or more artifacts being added to the computing machine and one or more updates being applied to the computing machine;
- determining, by the one or more processors, one or more activation procedures and activation information according to the updates, said activation procedures being configured to apply the updates when running the activation procedures according to the activation information;
- creating, by the one or more processors, the software image by copying the artifacts from the computing machine to a virtual disk and by adding the activation procedures and the activation information obtained from the activation procedures to the virtual disk;
- prior to said installing the software application, enabling one or more change sensors, each change sensor pertaining to a corresponding type of change of the one or more changes;
- prior to said installing the software application, registering one or more callback functions to an operating system of the computing machine for causing the operating system to communicate the one or more changes to the one or more change sensors corresponding to the one or more callback functions;
- during said installing the software application, receiving, by the one or more change sensors from the operating system, the one or more changes; and
- as soon as said installing the software application has been completed, cancelling registration of the one or more callback functions to the operating system of the computing machine.

14. The computing system of claim 13, wherein said detecting one or more changes comprises:
- collecting an indication of a first status of the computing machine before said installing the software application;
- collecting an indication of a second status of the computing machine after said installing the software application; and
- determining at least part of the one or more changes according to a comparison between the second status and the first status.

* * * * *